(No Model.)
H. ANDERSON.
HANDLE FOR LOCK KNOBS.
No. 428,442. Patented May 20, 1890.
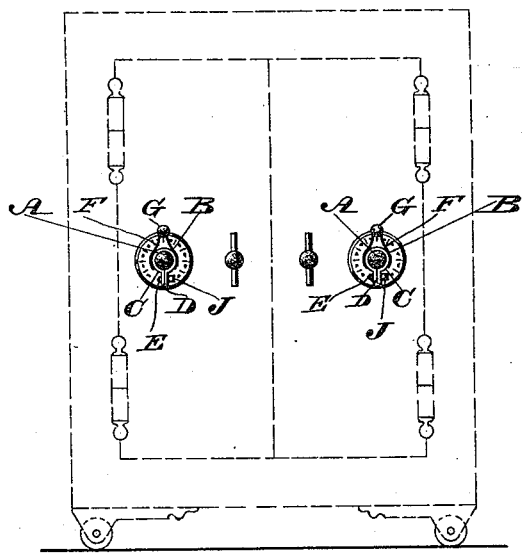
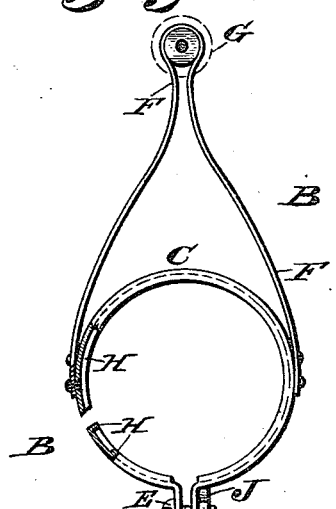
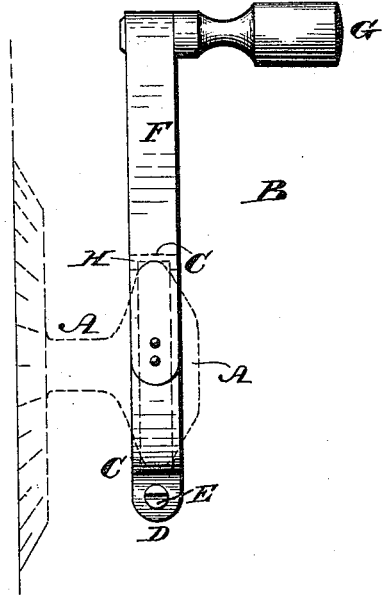

UNITED STATES PATENT OFFICE.

HARRY ANDERSON, OF PHILADELPHIA, PENNSYLVANIA.

HANDLE FOR LOCK-KNOBS.

SPECIFICATION forming part of Letters Patent No. 428,442, dated May 20, 1890.

Application filed December 6, 1889. Serial No. 332,765. (No model.)

*To all whom it may concern:*

Be it known that I, HARRY ANDERSON, a citizen of the United States, residing in the city and county of Philadelphia, State of Pennsylvania, have invented a new and useful Improvement in Handles for Knob-Locks, which improvement is fully set forth in the following specification and accompanying drawings.

My invention relates to a handle for a knob of a lock, more especially that of a combination-lock, whereby the same may be readily rotated or operated.

The invention consists of a divided flexible or elastic collar and ears at the ends thereof, with a screw fitted to said ears, and a handle proper connected with said collar.

It also consists in providing the collar with flanges, as will be hereinafter set forth.

Figure 1 represents a front or face view of a handle for a knob-lock embodying my invention. Fig. 2 represents a partial side elevation and partial section thereof on an enlarged scale. Fig. 3 represents a side elevation at a right angle to Fig. 2. Figs. 4 and 5 represent perspective views of portions of modifications.

Similar letters of reference indicate corresponding parts in the several figures.

Referring to the drawings, A designates the knob of a combination-lock, and B designates a handle applied thereto for convenience of rotating the same, said handle consisting of a divided collar C, adapted to embrace the knob, and is adjustable to knobs of different sizes, ears D on the ends of the collar, a screw E, passing through said ears, an arm F, which is secured to the collar, and a handle G on the end of the arm, the device in a measure forming a crank. It will be seen that the collar C, which is of flexible or elastic material, is expanded or opened and placed on the knob, after which the screw is tightened, whereby the collar is connected and clamped on the knob, and the latter may then be rotated with the collar by means of the handle G.

In order to prevent shifting or displacement of the collar from the knob, the inner periphery of the same is formed with flanges H, which may be continuous, as in Fig. 2, sectional or scalloped, as in Fig. 4, or of the form of studs or pins, as in Fig. 5.

The screw E is provided with a nut J for tightening purposes, it being evident that when said screw is loosened the collar expands or opens, so that it may be removed from the knob when required.

The arm F may be constructed of a bent strap or strip of sheet metal or a solid piece or pieces of material, as desired, one end being secured to the collar and the other end carrying the handle G.

Having thus described my invention, what I claim as new, and desire to secure by Letters Patent, is—

1. A divided collar of flexible or elastic material, ears on the ends of said collar, a clamping-screw fitted to said ears, and a handle connected with the said collar, the parts named being combined substantially as described.

2. A handle for a knob, consisting of a divided collar having flanges on its inner face and provided with ears, a clamping-screw and nut, an arm secured to said collar, and a handle secured to the outer end of the arm, said parts being combined substantially as described.

3. A handle for a knob, consisting of a divided collar having flanges on its inner face and provided with ears, a clamping-screw working in said ears and having a nut thereon, an arm consisting of a bent metallic strap secured at its ends to said collar, and a handle secured in the bent portion of the arm, combined substantially as described.

HARRY ANDERSON.

Witnesses:
JOHN A. WIEDERSHEIM,
JAMES F. KELLY.